(12) United States Patent
Ho

(10) Patent No.: US 8,556,764 B1
(45) Date of Patent: Oct. 15, 2013

(54) PLANETARY GEAR TYPE GENERATING SYSTEM

(71) Applicant: Fu-Hung Ho, Taichung (TW)

(72) Inventor: Fu-Hung Ho, Taichung (TW)

( * ) Notice: Subject to any disclaimer, the term of this patent is extended or adjusted under 35 U.S.C. 154(b) by 0 days.

(21) Appl. No.: 13/741,424

(22) Filed: Jan. 15, 2013

(51) Int. Cl.
*F16H 3/74* (2006.01)

(52) U.S. Cl.
USPC .......................................... 475/255; 475/330

(58) Field of Classification Search
USPC ......... 475/255, 257, 267, 330, 331; 74/572.1, 74/572.2, 574.2
See application file for complete search history.

(56) References Cited

U.S. PATENT DOCUMENTS

| | | | | |
|---|---|---|---|---|
| 1,741,860 A | * | 12/1929 | Lyman et al. | 475/255 |
| 1,741,861 A | * | 12/1929 | Lyman et al. | 475/255 |
| 1,741,862 A | * | 12/1929 | Lyman | 475/255 |
| 1,741,864 A | * | 12/1929 | Lyman | 475/255 |
| 1,883,355 A | * | 10/1932 | Edberg | 475/255 |
| 2,625,841 A | * | 1/1953 | Lewis | 475/255 |
| 7,985,156 B2 | * | 7/2011 | Han | 475/162 |
| 8,287,419 B2 | * | 10/2012 | Chang | 475/255 |
| 8,307,652 B1 | * | 11/2012 | Gallistel | 60/721 |

* cited by examiner

*Primary Examiner* — Justin Holmes
(74) *Attorney, Agent, or Firm* — Alan Kamrath; Kamrath IP Lawfirm, P.A.

(57) ABSTRACT

A generating system includes a workbench, a propeller shaft, at least two first gears, and at least one pair of swinging devices. Each of the swinging devices includes an annular gear fixed on the workbench, two rotation disks each rotatably mounted on the propeller shaft, a plurality of spindles each mounted between the rotation disks, a plurality of second gears each rotatably mounted on the respective spindle and each intermeshing with the respective first gear and the annular gear, and a plurality of weights each mounted on the respective spindle. The propeller shaft is connected with an external power and a generator. Thus, the weights of each of the swinging devices produce a successive torque by an inertia action to operate the generator so as to generate an electric power successively so that the generator outputs the electric power stably without interruption.

6 Claims, 8 Drawing Sheets

PLANETARY GEAR TYPE GENERATING SYSTEM

BACKGROUND OF THE INVENTION

1. Field of the Invention

The present invention relates to a generating system and, more particularly, to a planetary gear type generating system.

2. Description of the Related Art

A conventional generator is used to produce electricity by using a natural power, such as the hydraulic power, the wind power, the solar energy, the sea energy, the earth heat, the bio-diesel energy and the like. Thus, the electric power produced by the conventional generator can be used popularly. However, the source of the natural power is unsteady and is varied easily and rapidly so that the conventional generator cannot produce the electric power largely and steadily. In addition, the conventional generator cannot output the electric power steadily so that the output electric power from the conventional generator easily causes danger to the remote circuit.

BRIEF SUMMARY OF THE INVENTION

In accordance with the present invention, there is provided a generating system, comprising a workbench, a propeller shaft rotatably mounted on the workbench, at least two first gears each secured on the propeller shaft to rotate in concert with the propeller shaft, and at least one pair of swinging devices mounted on the workbench and each connected with a respective one of the first gears respectively. Each of the swinging devices includes an annular gear fixed on the workbench, two rotation disks each rotatably mounted on the propeller shaft, a plurality of spindles each mounted between the rotation disks, a plurality of second gears each rotatably mounted on a respective one of the spindles and each intermeshing with the respective first gear and the annular gear, and a plurality of weights each mounted on a respective one of the spindles. The propeller shaft has a first end connected with an external power and a second end connected with a generator.

The primary objective of the present invention is to provide a planetary gear type generating system comprising at least one pair of swinging devices that are rotated and operated by a planetary gear transmission to output a successive torque so as to generate an electric power.

According to the primary advantage of the present invention, the weights of each of the swinging devices produce a successive torque by an inertia action to rotate and operate the generator in a stable manner so as to generate an electric power successively so that the generator outputs the electric power stably without interruption, without causing danger to a remote electric circuit.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
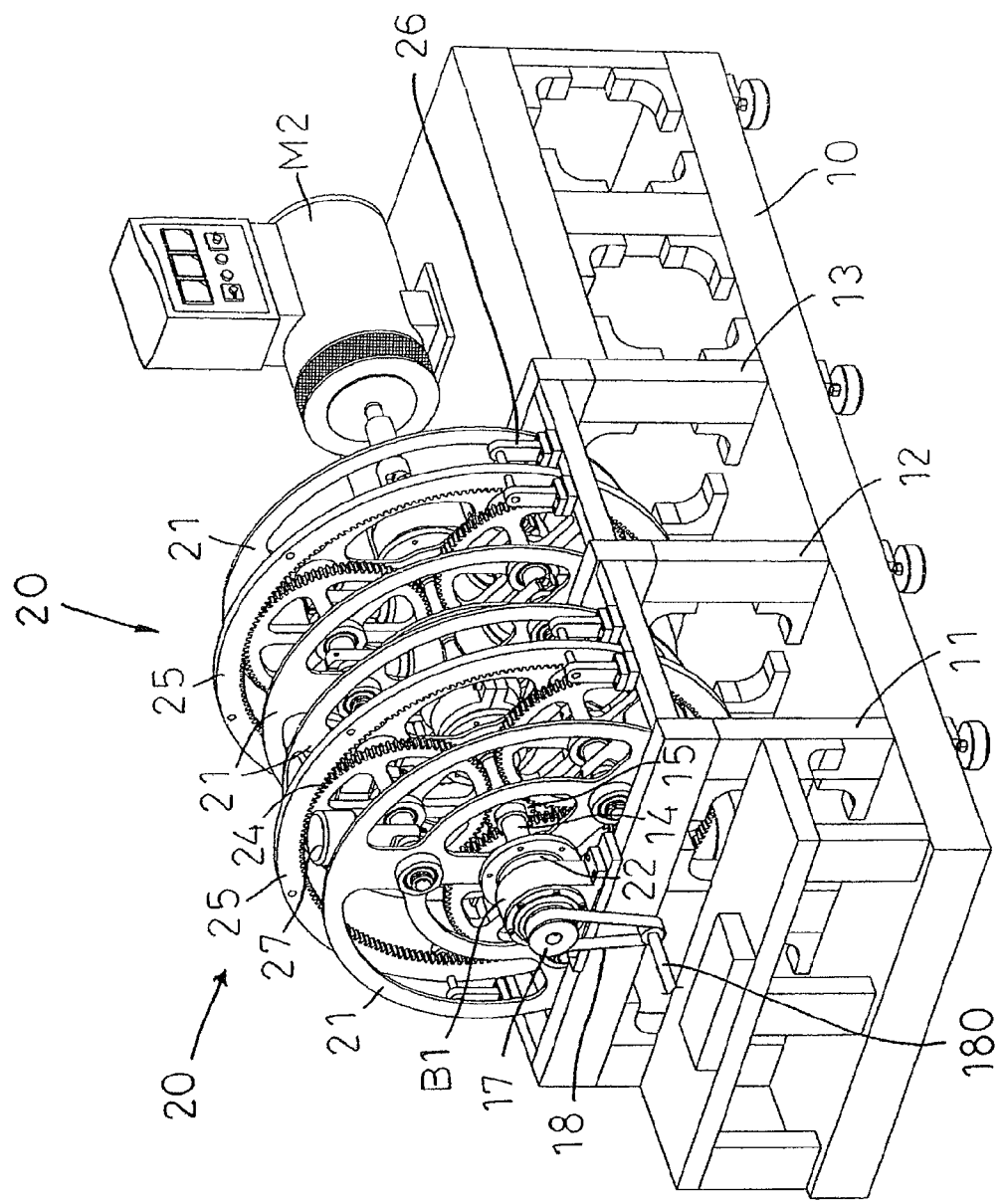
FIG. 1 is a perspective view of a generating system in accordance with the preferred embodiment of the present invention.
Figure 2:
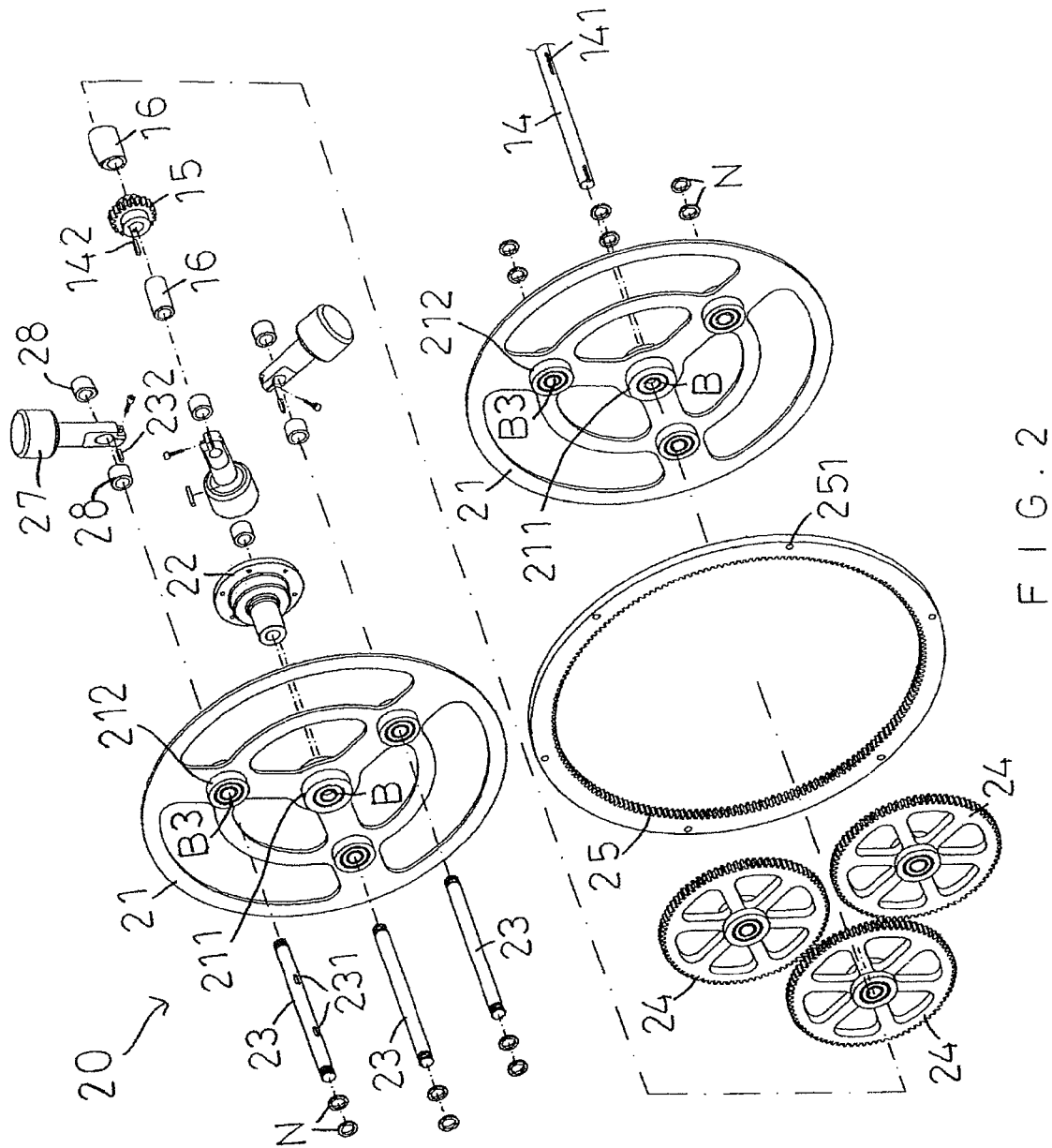
FIG. 2 is an exploded perspective view of a first one of the swinging devices of the generating system as shown in FIG. 1.
Figure 3:
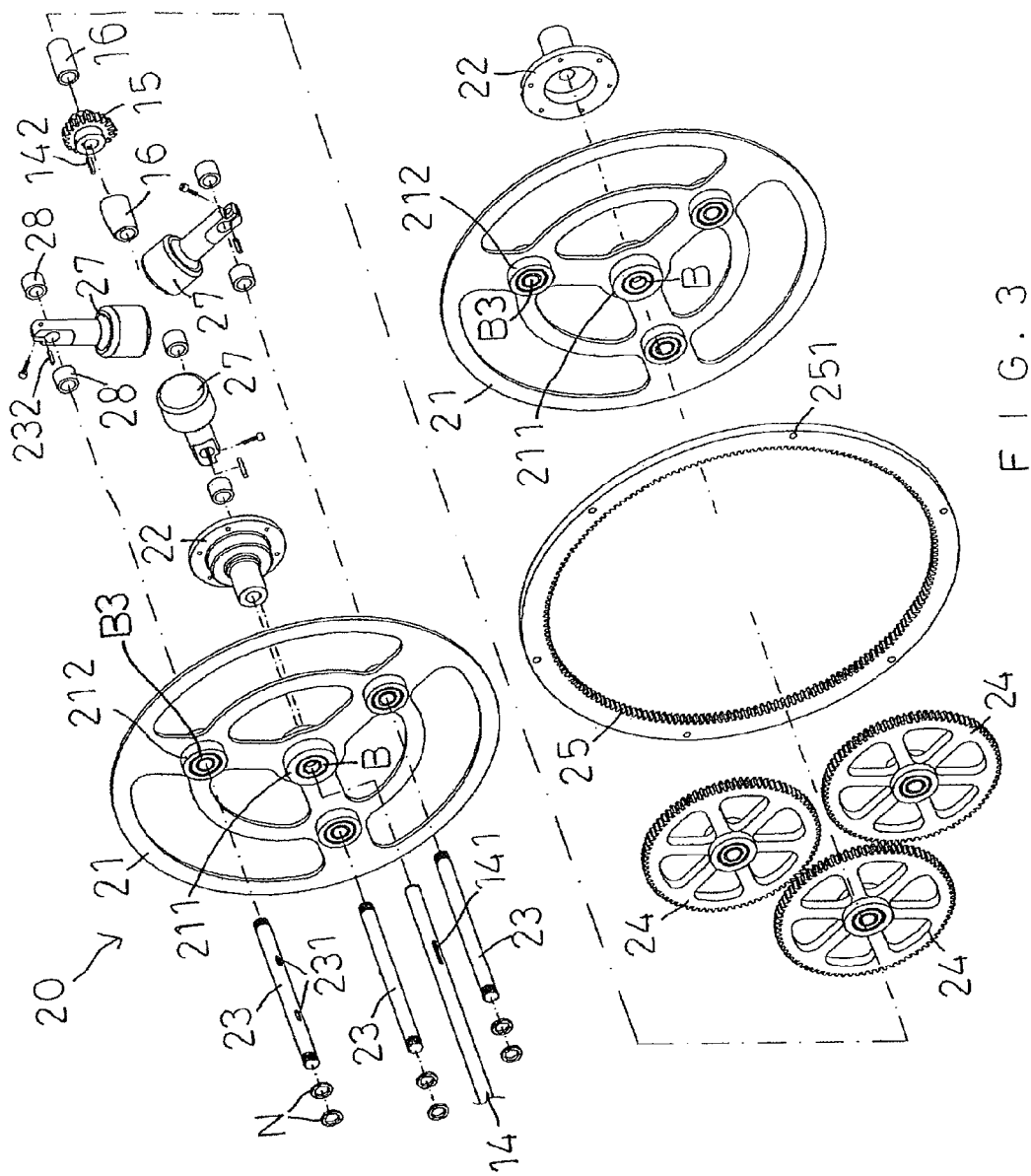
FIG. 3 is an exploded perspective view of a second one of the swinging devices of the generating system as shown in FIG. 1.
Figure 4:
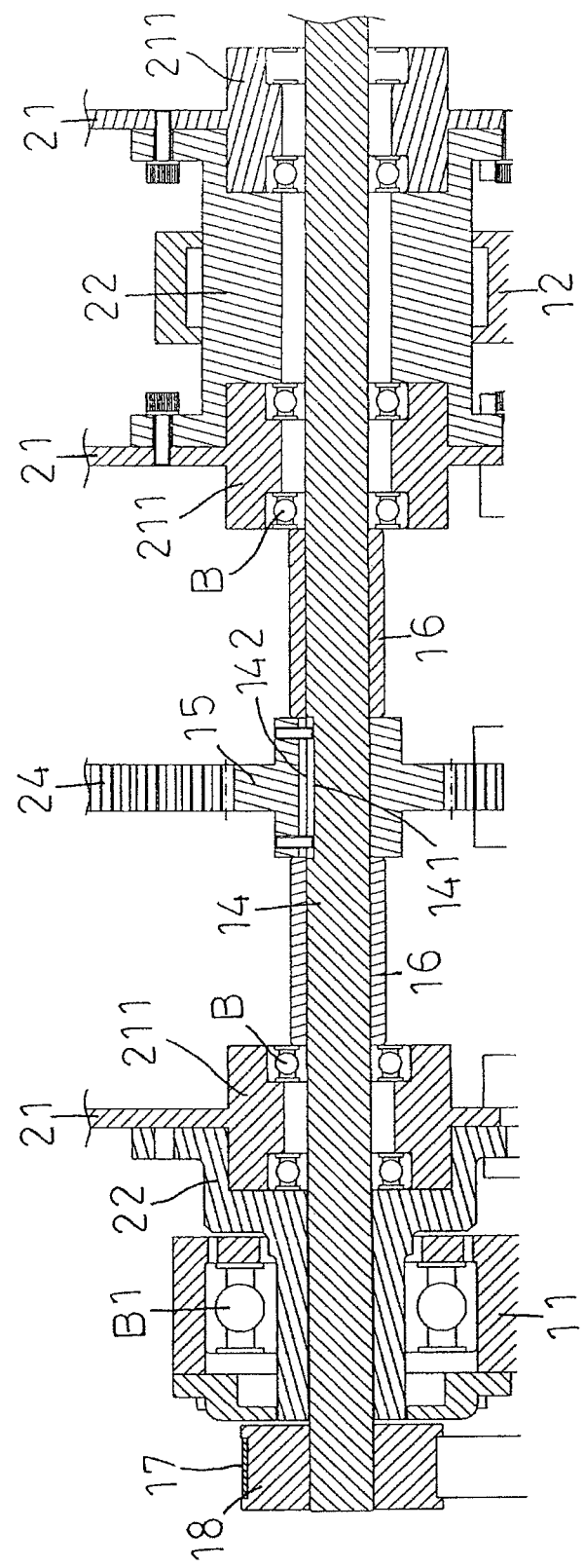
FIG. 4 is a partially front cross-sectional view of the generating system as shown in FIG. 1.
Figure 5:
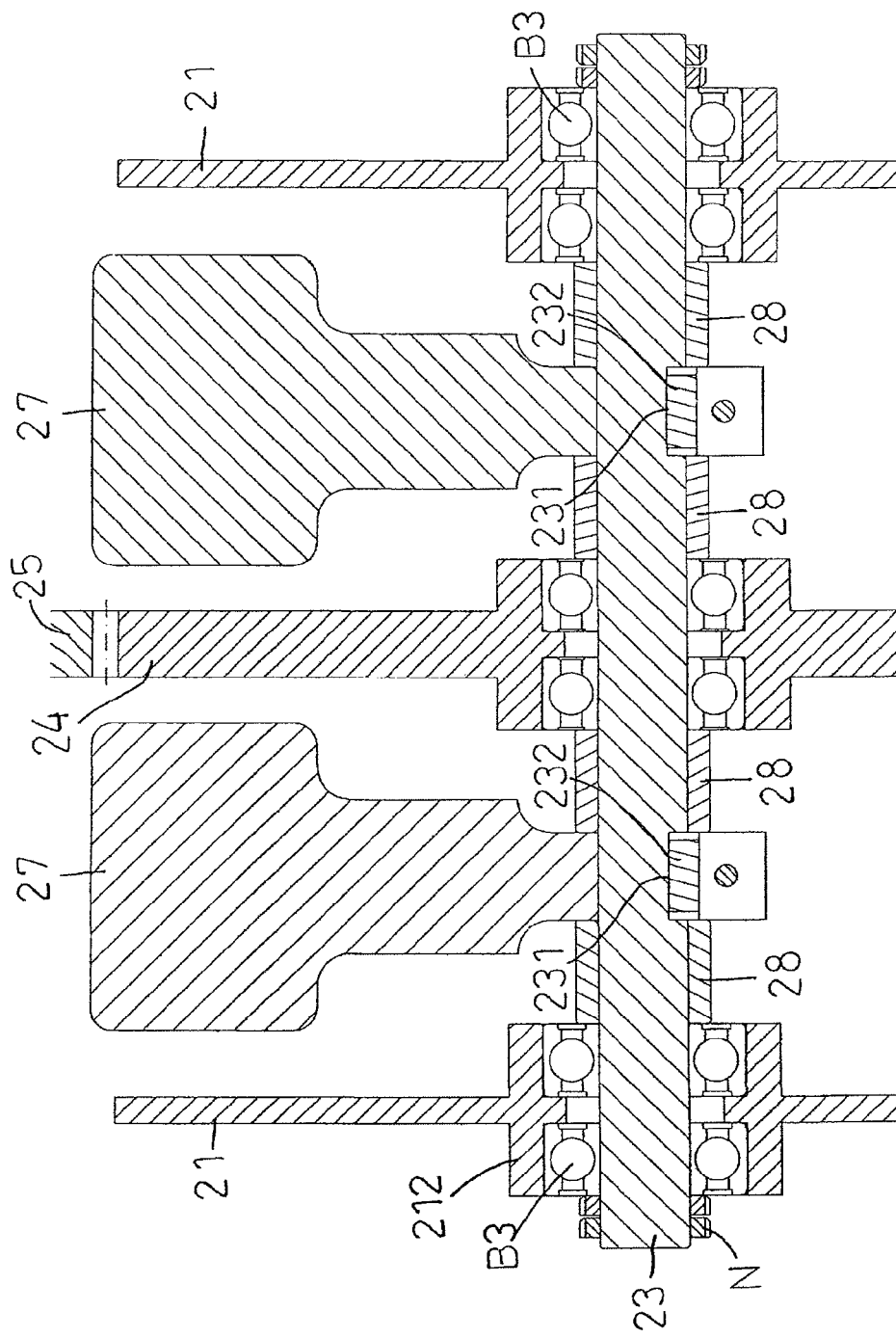
FIG. 5 is a partially front cross-sectional view of the generating system as shown in FIG. 1.

Referring to the drawings and initially to FIGS. 1-6, a planetary gear type generating system in accordance with the preferred embodiment of the present invention comprises a workbench 10, a propeller shaft 14 rotatably mounted on the workbench 10, at least two first gears 15 each secured on the propeller shaft 14 to rotate in concert with the propeller shaft 14, and at least one pair of swinging devices 20 mounted on the workbench 10 and each connected with a respective one of the first gears 15 respectively. In another preferred embodiment of the present invention, the generating system comprises multiple pairs of swinging devices 20 which are connected serially.

The workbench 10 is provided with a plurality of support frames 11, 12 and 13 for mounting the swinging devices 20.

The propeller shaft 14 is rotatably mounted on the workbench 10 by two bearings "B1" and "B2". The propeller shaft 14 has a first end connected with an external power and a second end connected with a generator "M2" by a connector 19. The external power is an intermittent power, such as a wind power or a hydraulic power. In the preferred embodiment of the present invention, the external power includes a belt wheel 17 secured on the first end of the propeller shaft 14, a belt 18 connected with the belt wheel 17, and a drive shaft 180 connected with the belt 18. The drive shaft 180 is driven by an impeller that is driven by the wind or hydraulic power. The drive shaft 180 drives the belt 18 which drives the propeller shaft 14. Thus, the propeller shaft 14 is driven and rotated by the external power. The propeller shaft 14 has a periphery provided with at least two positioning keyways 141.

Each of the first gears 15 is secured on the propeller shaft 14 by at least one positioning key 142 which is fixed in the respective positioning keyway 141 of the propeller shaft 14. Each of the first gears 15 has two opposite sides each provided with a first spacer 16 which is mounted on the propeller shaft 14.

Each of the swinging devices 20 includes an annular gear 25 fixed on the workbench 10, a plurality of locating racks 26 mounted on the workbench 10 and connected with the annular gear 25 for fixing the annular gear 25, two rotation disks 21 each rotatably mounted on the propeller shaft 14, a plurality of bushings 22 mounted between the rotation disks 21 and the propeller shaft 14, a plurality of spindles 23 each mounted between the rotation disks 21, a plurality of retainers "N" secured on each of the spindles 23 and abutting the rotation disks 21 to limit the rotation disks 21, a plurality of second gears 24 each rotatably mounted on a respective one of the spindles 23 and each intermeshing with the respective first gear 15 and the annular gear 25, and a plurality of weights 27 each mounted on a respective one of the spindles 23.

In the preferred embodiment of the present invention, each of the swinging devices 20 includes three spindles 23, three second gears 24 and three weights 27.

Each of the spindles 23 of each of the swinging devices 20 is extended through the annular gear 25. Each of the spindles 23 of each of the swinging devices 20 has a periphery provided with a plurality of locating keyways 231.

The annular gear 25 of each of the swinging devices 20 is disposed between the rotation disks 21. The annular gear 25 of each of the swinging devices 20 has a periphery provided with a plurality of positioning holes 251 locked by the locating racks 26 so that the annular gear 25 of each of the swinging devices 20 is kept at a stationary state to balance the second gears 24, and the second gears 24 are moved along the annular gear 25 evenly and smoothly.

Each of the second gears 24 of each of the swinging devices 20 is located between the respective first gear 15 and the annular gear 25 and has a diameter greater than that of the respective first gear 15. Each of the second gears 24 of each of the swinging devices 20 is driven by the respective first gear 15 to rotate and move in the annular gear 25.

Each of the weights 27 of each of the swinging devices 20 is disposed between the rotation disks 21 and the annular gear 25. Each of the weights 27 of a first one of the swinging devices 20 is directed to a direction opposite to that of each of the weights 27 of a second one of the swinging devices 20. Each of the weights 27 of each of the swinging devices 20 has two opposite sides each provided with a second spacer 28 which is mounted on the respective spindle 23. The second spacer 28 is located between each of the weights 27, the annular gear 25 and each of the rotation disks 21 to space and position each of the weights 27. Each of the weights 27 of each of the swinging devices 20 is secured on the respective spindle 23 by a plurality of locating keys 232 which are fixed in the locating keyways 231 of the respective spindle 23.

Each of the rotation disks 21 of each of the swinging devices 20 has a center provided with a central mounting portion 211 for mounting a central bearing "B" which is rotatably mounted on the propeller shaft 14. Each of the rotation disks 21 of each of the swinging devices 20 has a periphery provided with a peripheral mounting portion 212 for mounting a peripheral bearing "B3" which is rotatably mounted on a respective one of the spindles 23. The first spacer 16 is located between each of the first gears 15 and each of the rotation disks 21 of each of the swinging devices 20 to space and position each of the first gears 15.

Each of the bushings 22 of each of the swinging devices 20 is rotatably mounted in the central bearing "B" of a respective one of the rotation disks 21. In the preferred embodiment of the present invention, each of the swinging devices 20 includes three bushings 22 aligning respectively with the support frames 11, 12 and 13 of the workbench 10. Two of the bushings 22 are rotatably mounted in the bearings "B1" and "B2" and are locked onto the rotation disks 21 respectively.

Figure 6:
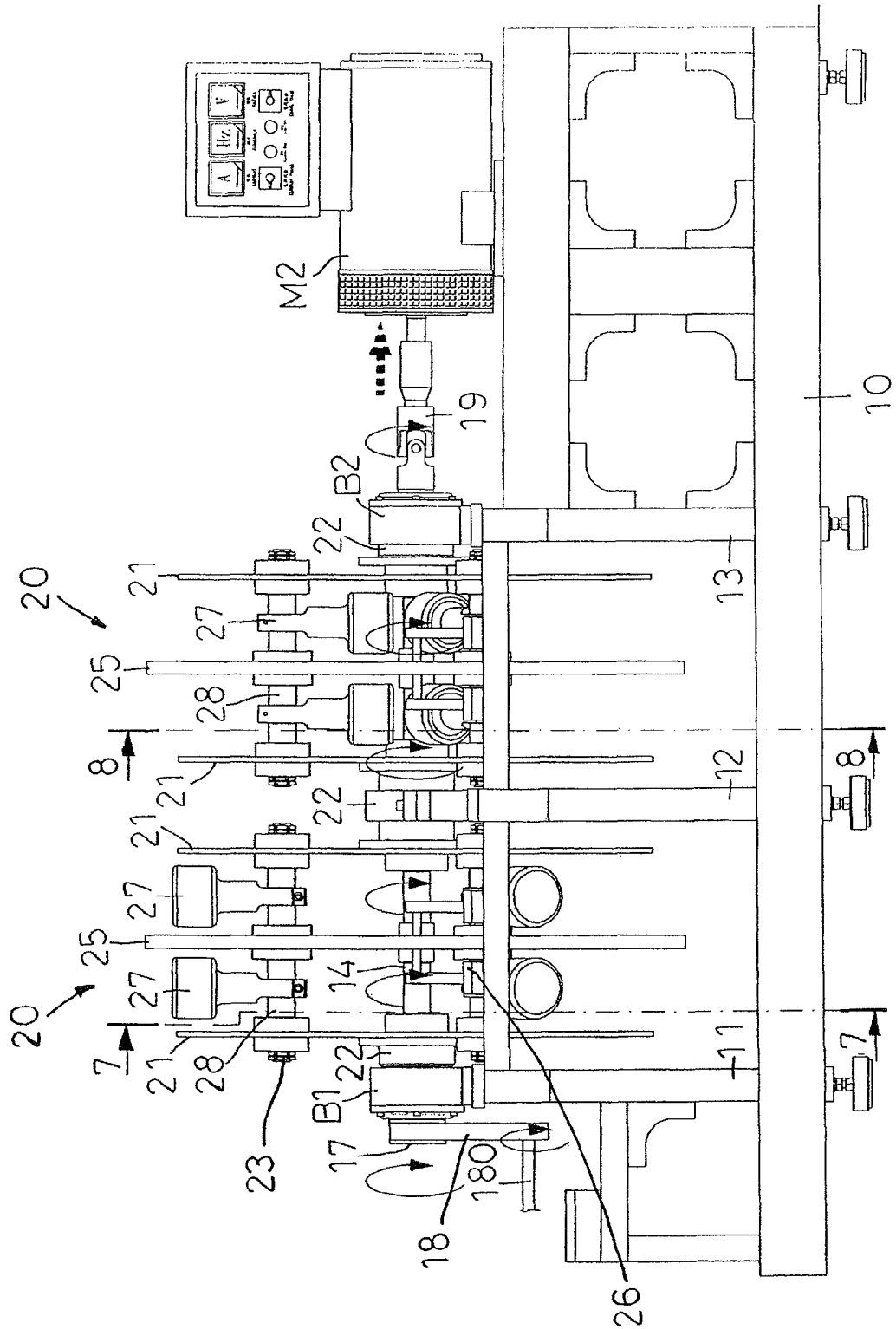
FIG. 6 is a front view of the generating system as shown in FIG. 1.
Figure 7:
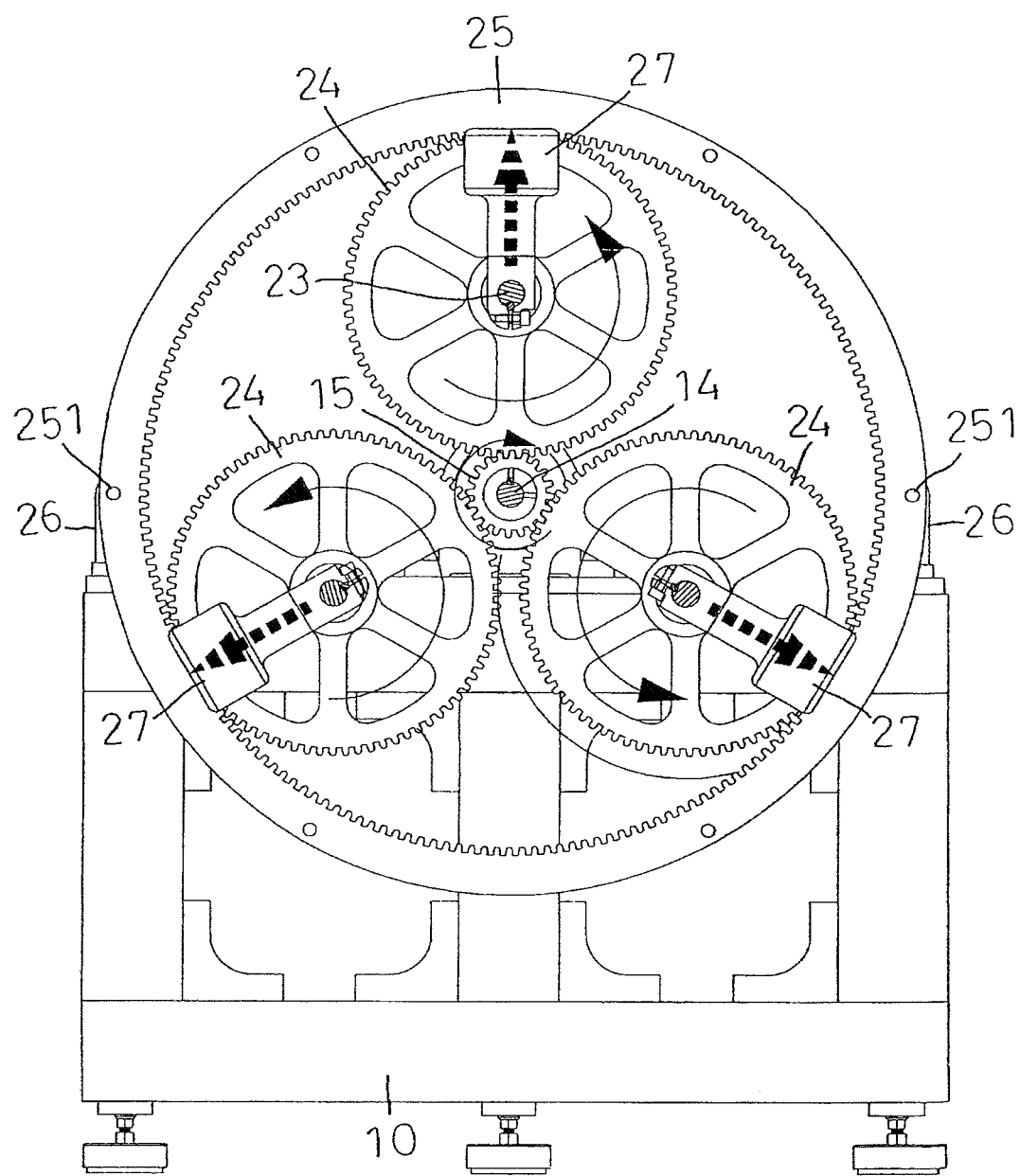
FIG. 7 is a side cross-sectional view of the generating system taken along line 7-7 as shown in FIG. 6.
Figure 8:
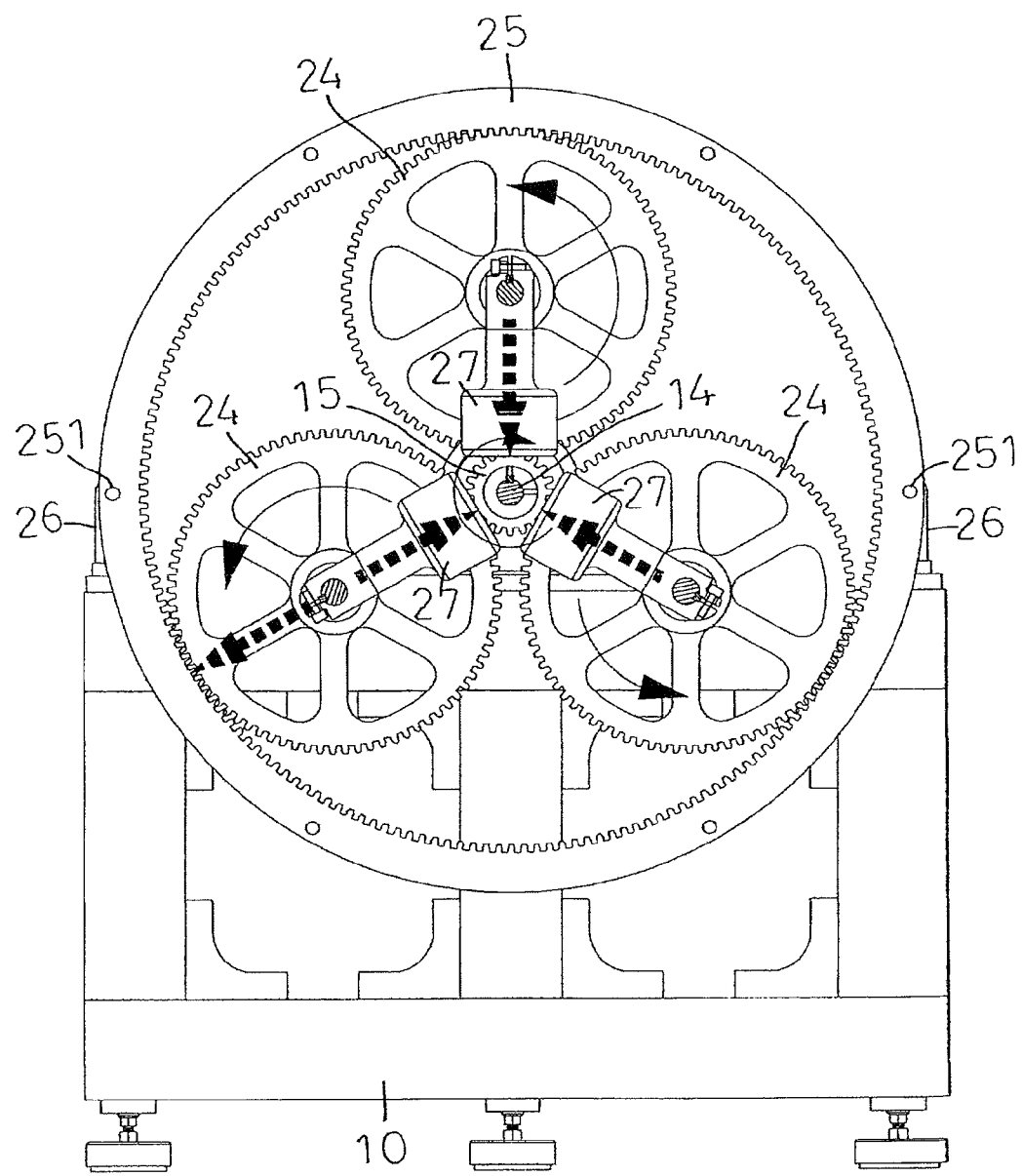
FIG. 8 is a side cross-sectional view of the generating system taken along line 8-8 as shown in FIG. 6.

In operation, referring to FIGS. 6-8 with reference to FIGS. 1-5, each of the swinging devices 20 cannot be operated by itself and has to be driven by the external power. In use, when the propeller shaft 14 is rotated by the external power, each of the first gears 15 is rotated to drive the second gears 24 of each of the swinging devices 20, so that the second gears 24 of each of the swinging devices 20 are rotated and moved along the annular gear 25 to perform a planetary motion. In such a manner, the spindles 23 of each of the swinging devices 20 are moved by the second gears 24, so that the rotation disks 21 of each of the swinging devices 20 are rotated by the spindles 23, and the weights 27 of each of the swinging devices 20 are moved by the spindles 23 and are rotated at a high speed.

After the external power is interrupted, the weights 27 of each of the swinging devices 20 are rotated successively by an inertia action to produce a swinging motion, so that the spindles 23 of each of the swinging devices 20 are moved and rotated by the swinging motion of the weights 27, and the rotation disks 21 of each of the swinging devices 20 are rotated by the spindles 23. At this time, the weights 27 of each of the swinging devices 20 are equally spaced from each other and arranged and distributed evenly to prevent the workbench 10 from being vibrated. In such a manner, the second gears 24 of each of the swinging devices 20 are driven by the spindles 23 and are rotated and moved along the annular gear 25 to perform the planetary motion, so that each of the first gears 15 is rotated by the second gears 24 of each of the swinging devices 20, and the propeller shaft 14 is rotated by the first gears 15 to drive the generator "M2". Thus, the generator "M2" is operated by a successive rotation of the propeller shaft 14 to generate an electric power successively which is stored in a storage battery.

In conclusion, the propeller shaft 14 is initially rotated by the external power to start each of the swinging devices 20 so that each of the swinging devices 20 is operated and rotated successively by the successive swinging motion of the weights 27 of each of the swinging devices 20 to produce a successive torque so as to rotate the propeller shaft 14 successively and to drive the generator "M2" so as to generate an electric power successively.

In practice, when the propeller shaft 14 drives the first gears 15 to rotate, the second gears 24 of each of the swinging devices 20 are driven by each of the first gears 15 to rotate in the annular gear 25 at a high speed by a planetary gear transmission, so as to increase the inertia action of the weights 27 of each of the swinging devices 20. When the second gears 24 of each of the swinging devices 20 are rotated, the weights 27 of each of the swinging devices 20 are driven by the spindles 23. At this time, the weight of the weights 27 of each of the swinging devices 20 is not balanced so that the weights 27 of each of the swinging devices 20 produce a swinging motion. In such a manner, the propeller shaft 14 is driven by the swinging motion of the weights 27 of each of the swinging devices 20 to produce a successive torque so as to rotate and operate the generator "M2". At this time, the weights 27 of each of the swinging devices 20 are equally spaced from each other, with an angle of one hundred and twenty degrees (120°), so that the weights 27 of each of the swinging devices 20 are moved evenly and stably without producing vibration so as to reduce the noise during operation. In addition, each of the weights 27 of a first one of the swinging devices 20 is directed to a direction opposite to that of each of the weights 27 of a second one of the swinging devices 20, so that when each of the weights 27 of the first one of the swinging devices 20 is swung outward as shown in FIG. 7, each of the weights 27 of the second one of the swinging devices 20 is swung inward as shown in FIG. 8. In such a manner, the propeller shaft 14 is driven by the staggered swinging motion of the weights 27 of each of the swinging devices 20 to produce a successive torque without interruption. Thus, the first one of the swinging devices 20 and the second one of the swinging devices 20 are connected serially to produce a successive torque that is required for rotation of the generator "M2".

Accordingly, the weights 27 of each of the swinging devices 20 produce a successive torque by an inertia action to rotate and operate the generator "M2" in a stable manner so as to generate an electric power successively so that the generator "M2" outputs the electric power stably without interruption, without causing danger to a remote electric circuit.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A generating system, comprising:
a workbench;
a propeller shaft rotatably mounted on the workbench;
at least two first gears each secured on the propeller shaft to rotate in concert with the propeller shaft; and
at least one pair of swinging devices mounted on the workbench and each connected with a respective one of the first gears respectively; wherein:
each of the swinging devices includes:
an annular gear fixed on the workbench;
two rotation disks each rotatably mounted on the propeller shaft;
a plurality of spindles each mounted between the rotation disks;
a plurality of second gears each rotatably mounted on a respective one of the spindles and each intermeshing with the respective first gear and the annular gear; and
a plurality of weights each mounted on a respective one of the spindles;
the propeller shaft has a first end connected with an external power and a second end connected with a generator.

2. The generating system of claim 1, wherein:
each of the swinging devices includes three spindles, three second gears and three weights;
each of the swinging devices further includes a plurality of locating racks mounted on the workbench and connected with the annular gear for fixing the annular gear;
the annular gear of each of the swinging devices has a periphery provided with a plurality of positioning holes locked by the locating racks;
each of the second gears of each of the swinging devices is located between the respective first gear and the annular gear and has a diameter greater than that of the respective first gear;
each of the weights of each of the swinging devices is disposed between the rotation disks and the annular gear;
each of the weights of a first one of the swinging devices is directed to a direction opposite to that of each of the weights of a second one of the swinging devices;
each of the rotation disks of each of the swinging devices has a center provided with a central mounting portion for mounting a central bearing which is rotatably mounted on the propeller shaft; and
each of the rotation disks of each of the swinging devices has a periphery provided with a peripheral mounting portion for mounting a peripheral bearing which is rotatably mounted on a respective one of the spindles.

3. The generating system of claim 2, wherein:
the workbench is provided with a plurality of support frames for mounting the swinging devices;
the propeller shaft is rotatably mounted on the workbench by two bearings;
each of the first gears has two opposite sides each provided with a first spacer which is mounted on the propeller shaft;
the first spacer is located between each of the first gears and each of the rotation disks of each of the swinging devices to space and position each of the first gears;
each of the swinging devices further includes a plurality of bushings mounted between the rotation disks and the propeller shaft;
each of the bushings of each of the swinging devices is rotatably mounted in the central bearing of a respective one of the rotation disks;
each of the weights of each of the swinging devices has two opposite sides each provided with a second spacer which is mounted on the respective spindle; and
the second spacer is located between each of the weights, the annular gear and each of the rotation disks to space and position each of the weights.

4. The generating system of claim 1, wherein the generating system comprises multiple pairs of swinging devices which are connected serially.

5. The generating system of claim 1, wherein the external power is a wind power or a hydraulic power.

6. The generating system of claim 1, wherein each of the second gears of each of the swinging devices is driven by the respective first gear to rotate and move in the annular gear.

* * * * *